United States Patent
Pajukoski et al.

(10) Patent No.: US 9,301,318 B2
(45) Date of Patent: Mar. 29, 2016

(54) RANDOM ACCESS PROCEDURE WITH ENHANCED COVERAGE

(75) Inventors: Kari Pajukoski, Oulu (FI); Esa Tiirola, Oula (FI); Markku J. Vainikka, Kiviniemi (FI); Juha S. Korhonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1640 days.

(21) Appl. No.: 11/655,763

(22) Filed: Jan. 18, 2007

(65) Prior Publication Data
US 2007/0206531 A1     Sep. 6, 2007

Related U.S. Application Data

(60) Provisional application No. 60/760,474, filed on Jan. 20, 2006.

(51) Int. Cl.
| | |
|---|---|
| H04W 74/00 | (2009.01) |
| H04W 8/26 | (2009.01) |
| H04W 56/00 | (2009.01) |
| H04W 72/04 | (2009.01) |
| H04W 72/14 | (2009.01) |
| H04W 74/08 | (2009.01) |

(52) U.S. Cl.
CPC ........ *H04W 74/002* (2013.01); *H04W 74/0866* (2013.01); *H04W 8/26* (2013.01); *H04W 56/0085* (2013.01); *H04W 72/042* (2013.01); *H04W 72/14* (2013.01); *H04W 74/0833* (2013.01)

(58) Field of Classification Search
CPC .......... H04W 74/0866; H04W 74/002; H04W 74/0833; H04W 8/26; H04W 56/0085; H04W 72/14; H04W 72/42

USPC ........ 370/329–349; 455/434–436, 446–452.2
See application file for complete search history.

(56) References Cited

U.S. PATENT DOCUMENTS 6,925,561 B1    8/2005    Hunt et al.
8,054,791 B2 *   11/2011    Vujcic ........................... 370/329
(Continued)

FOREIGN PATENT DOCUMENTS

| EP | 1109326 | 6/2001 |
|---|---|---|
| JP | 2001230703 | 8/2001 |

(Continued)

OTHER PUBLICATIONS

Ultra FDD; Physical layer procedures, Technical Report, Jan. 1999, European Telecommunications Standards Institute (ETSI); XP014030016, see pp. 5-8, 13-15.

(Continued)

*Primary Examiner* — Nizar Sivji
(74) *Attorney, Agent, or Firm* — Harrington & Smith (57) ABSTRACT

A random access procedure for use by a UE wireless communication terminal in communicating with a base station (or Node-B or eNB) of a radio access network, and in particular a E-UTRA network. A random access preamble is sent by the UE via RACH separate and prior to a random access message burst, which is sent on SCH but not until the UE receives one or more messages indicating an acknowledgment of the preamble and providing an allocation on SCH for use in transmitting the message burst, and also providing a preamble identifier, which the radio access network can then use to request retransmission of the message burst if necessary.

49 Claims, 4 Drawing Sheets

(56) References Cited

U.S. PATENT DOCUMENTS

| | | | |
|---|---|---|---|
| 2001/0026543 A1 | 10/2001 | Hwang et al. | |
| 2002/0041578 A1 | 4/2002 | Kim et al. | |
| 2002/0068557 A1* | 6/2002 | Heo | 455/422 |
| 2002/0114297 A1* | 8/2002 | Karna et al. | 370/335 |
| 2005/0002361 A1* | 1/2005 | Dick et al. | 370/335 |
| 2006/0135187 A1* | 6/2006 | Kim et al. | 455/466 |
| 2009/0252125 A1* | 10/2009 | Vujcic | 370/336 |

FOREIGN PATENT DOCUMENTS

| | | |
|---|---|---|
| JP | 2003513573 | 4/2003 |
| JP | 2003523686 | 8/2003 |
| JP | 2003535553 | 11/2003 |
| JP | 2004266854 | 9/2004 |
| JP | 2004274794 | 9/2004 |
| JP | 2005223474 | 8/2005 |
| KR | 10-1018037 B1 | 3/2011 |
| KR | 101021850 B1 | 3/2011 |
| WO | WO 0036761 | 6/2000 |

OTHER PUBLICATIONS

Satellite Earth Stations and Systems (SES); Satellite Component of UMTS/IMT-200; Analysis and definition of the Packet Mode. Technical Report Jul. 2001, European Telecommunications Standards Institute (ETSI), XP014005011. See sections 4.3.2.1-4.3.4; 4.5.2-4.5.3; 7.1-7.3.2; A.2-A4.4.

English Language Translation of JP Publication 2005223474 Abstract.

English Language Translation of JP Publication 2003513573 Abstract not available, English Language abstract of corresponding WO 0133884 enclosed.

English Language Translation of JP Publication 2004266854 Abstract.

English Language Translation of JP Publication 2004274794 Abstract.

English Language Translation of JP Publication 2001230703 Abstract.

English Language Translation of JP Publication 2003523686 Abstract not available, English Language abstract of corresponding WO 0161877 enclosed.

English Language Translation of JP Publication 2003535553 Abstract.

3GPP TSG-RAN WG2 #56bis, R2-070105; Jan. 15-19, 2006; Sorrento, Italy; *Initial Random Access for LCR TDD*; Agenda Item: 5.2.2; Jan. 19, 2006 (5 pages).

* cited by examiner

RANDOM ACCESS PROCEDURE WITH ENHANCED COVERAGE

CROSS REFERENCE TO RELATED APPLICATION

Reference is made to and priority claimed from U.S. provisional application Ser. No. 60/760,474, filed Jan. 20, 2006.

BACKGROUND OF THE INVENTION

1. Technical Field

The present invention pertains to the field of wireless communication. More particularly, the present invention pertains to the random access procedure that a User Equipment (UE) (wireless communication terminal) follows for (among other uses) initial network access.

2. Discussion of Related Art

The evolved UTRA (E-UTRA or evolved UMTS (Universal Mobile Telecommunication System) Terrestrial Radio Access) network architecture includes a radio access network (providing UEs access to a core network of a cellular communication system) where the radio resources are divided into blocks of time (sub-frames) and frequency (frequency blocks). In the uplink, these blocks are used either for what is called here the Shared CHannel (SCH) or the contention-based Random Access CHannel (RACH). (The designation SCH is used here only to indicate uplink radio resources from which a base station can allocate a share for each individual UE, not any particular channel that may be designated by the acronym SCH.) The E-UTRA network includes entities that are called here base stations, and are elsewhere sometimes called Node-Bs, or eNBs. A base station of an E-UTRA network allocates SCH resources for UEs and RACH is used by the UEs to access the network or request SCH resources (or possibly to communicate a small amount of user data in some networks under some circumstances). RACH is also used in networks other than E-UTRA type radio network. RACH is in general a contention-based resource (as opposed to a shared resource) used by UEs to access a radio access network typically for initial access and bursty data transmission.

In the prior art, the random access procedure is used (i.e. RACH is used or an analogous contention-based resource) when a UE needs to transmit user traffic (voice or data) or send a synchronization burst but the UE does not have an allocation of system resources on SCH. The UE may want to perform initial network access, make a location area update, move from the idle mode to the active state, or request capacity while in the active state. The random access procedure ends in an E-UTRA network when the radio access network gives the UE a timing advance value (to compensate for the time between sending a message to the radio access network and the latter receiving the message, and vice versa) and an allocation on SCH (for use as a traffic channel for sending voice or user data to the radio access network).

The problem is to design a random access procedure that provides good coverage and low delay, with minimum use of resources.

The prior art teaches transmitting the random access message (over RACH) on a constant frequency band. It can be advantageous to use a non-constant frequency band. In addition, it can be advantageous to use HARQ (hybrid automatic repeat request processing) in connection with the random access procedure.

The invention can involve what is called here a temporary cell specific address, and now in the art sometimes called a C-RNTI (Cell Radio Network Temporary Identity). The temporary cell specific address/C-RNTI is shorter (e.g. 16 bits) than other unique identifiers such as TMSI (temporary mobile subscriber identifier), IMSI (international mobile subscriber identity), and IMEI (international mobile equipment identity), and so can be used more easily. All the resource allocations are made using the temporary cell specific address (to identity the receiver of the resources). A UE can receive a temporary cell specific address when it first establishes communication with a cell.

DISCLOSURE OF INVENTION

Accordingly, in a first aspect of the invention, a method is provided for use by a user equipment wireless communication terminal in communicating with a base station of a radio access network of a wireless communication system, comprising: (a) providing for transmission over a random access channel of the wireless communication system a message burst preamble, and including a signature with the preamble; (b) receiving from the base station in response one or more messages indicating an acknowledgment of having received the preamble and providing a preamble identifier and a resource allocation of a shared channel; and (c) providing a message burst for transmission on the shared channel according to the resource allocation, but not until receiving the messages indicating an acknowledgment and providing a resource allocation, and including an address in the message burst for use in identifying the user equipment.

In accord with the first aspect of the invention, the resource allocation may be provided in a message separate from the message indicating the acknowledgment.

Also in accord with the first aspect of the invention, the address may be a temporary cell specific address or a random address.

Also in accord with the first aspect of the invention, the method may further comprise: receiving a request for retransmission from the base station indicating the preamble identifier; and providing the message burst for retransmission to the base station. In this, the request for retransmission may be a signal from the base station on a downlink shared control channel indicating an uplink resource allocation and including the preamble identifier.

Also in accord with the first aspect of the invention, the method may further comprise receiving an acknowledgement of the base station having received the message burst. In this, the acknowledgement may be a signal from the base station on a downlink shared control channel indicating a downlink resource allocation and including the preamble identifier, and the user equipment may be configured to decode the signal and obtain an address indicated by the signal, and then compare the address with the address included by the user equipment in the message burst to determine if the acknowledgement is an acknowledgement of the message burst or instead the acknowledgement of a message burst from another user equipment.

Also in accord with the first aspect of the invention, the method may further comprise frequency-hopping the message burst preamble, i.e.: providing for transmission a portion of the message burst using a first narrow frequency range of the shared channel frequency range; and providing for transmission another portion of the message burst using a second narrow frequency range of the shared channel frequency range different from the first narrow frequency range. The preamble may also be frequency-hopped (but on the random access channel).

Also in accord with the first aspect of the invention, the method may further comprise obtaining from the one or more messages indicating the acknowledgement (of the preamble) a digest of the signature or a signature number, and determining whether the acknowledgment is an acknowledgement of the preamble sent by the user equipment or an acknowledgment of a message from another user equipment wireless communication device.

Also in accord with the first aspect of the invention, the method may further comprise receiving from the base station a further allocation of the shared channel for uplink of user data in response to the message burst, wherein the allocation is provided with the address provided by the user equipment, and wherein the message burst includes information bits providing information useable by the base station in determining the further allocation to assign to the user.

In a second aspect of the invention, a method is provided for use by a base station of a radio access network of a wireless communication system in communicating with a user equipment wireless communication terminal, comprising: (a) receiving over a random access channel of the wireless communication system a message burst preamble and a signature; (b) providing for transmission one or more messages in response to the message burst preamble, wherein the one or more messages indicate an acknowledgment of having received the preamble and include a preamble identifier and a resource allocation of at least a portion of a shared channel; and (c) receiving a message burst on the shared channel according to the resource allocation, decoding the message burst, and obtaining an address in the message burst for use in identifying the user equipment.

Equipment (for a user and for a radio access network) and computer program products (for user equipment and for radio access network equipment) corresponding to the first and second aspects of the invention are also provided.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention involves or is related to cooperation between elements of a wireless communication system, and in particular between a user equipment (UE) wireless communication terminal and the element of a radio access network of a wireless communication system by which the UE connects to the wireless communication system. Examples of a wireless communication system include implementations of GSM (Global System for Mobile Communication) and implementations of UMTS (Universal Mobile Telecommunication System). Each such wireless communication system includes a radio access network (RAN). In UMTS, the RAN is called UTRAN (UMTS Terrestrial RAN). A UTRAN includes one or more Radio Network Controllers (RNCs), each having control of one or more Node Bs, which are wireless terminals configured to communicatively couple to one or more UE terminals. The combination of an RNC and the Node Bs it controls is called a Radio Network System (RNS). A GSM RAN includes one or more base station controllers (BSCs), each controlling one or more base transceiver stations (BTSs). The combination of a BSC and the BTSs it controls is called a base station system (BSS).

Figure 1:
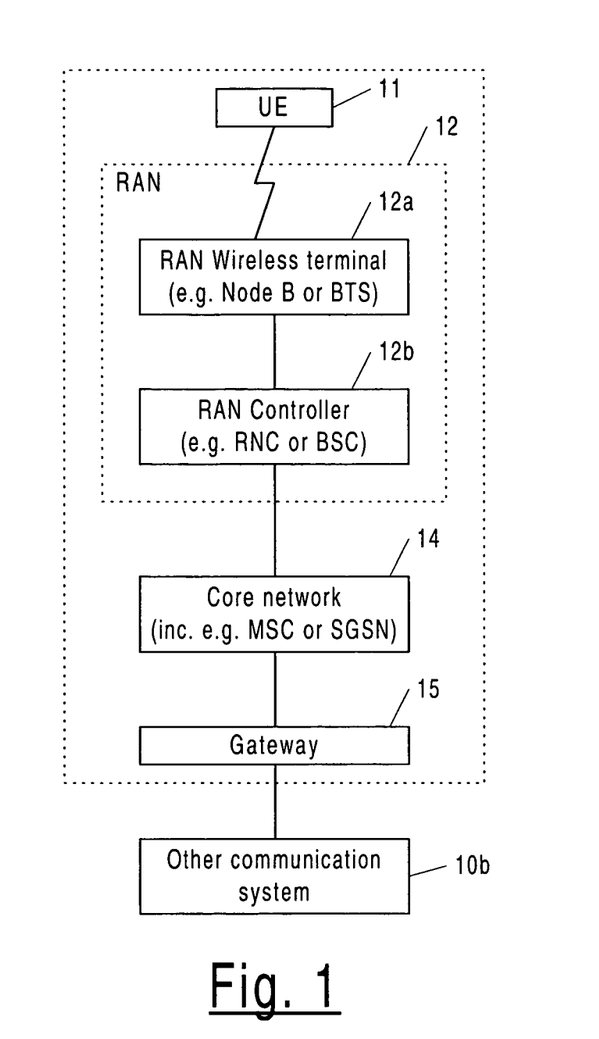
FIG. 1 is a block diagram/flow diagram of a wireless communication system in which the present invention may be implemented, including various communication terminals, and in particular a user equipment (UE) wireless communication terminal and a wireless communication terminal of a radio access network (RAN) used for wireless coupling to user equipment.

Referring now to FIG. 1, a wireless communication system 10a in which the present invention may be implemented is shown, including a UE (wireless communication) terminal 11, a radio access network 12, a core network 14 and a gateway 15, coupled via the gateway to another communications system 10b, such as the Internet, wireline communication systems (including the so-called plain old telephone system), and/or other wireless communication systems. The radio access network includes a wireless terminal 12a (e.g. a Node B or a BTS, both of which are called here simply a base station) and a controller 12b (e.g. a RNC or a BSC). The controller is in wireline communication with the core network. The core network typically includes a mobile switching center (MSC) for circuit-switched communication, and a serving general packet radio service (GPRS) support node (SGSN) for packet-switched communication.

LTE, or Long Term Evolution (also known as 3.9G), refers to research and development involving the Third Generation Partnership Project (3GPP) aimed at identifying technologies and capabilities that can improve systems such as the UMTS. Generally speaking, a prefix of the letter "E" in upper or lower case signifies LTE. The E-UTRAN consists of eNBs (E-UTRAN or enhanced Node Bs), providing the E-UTRA user plane (RLC/MAC/PHY) and control plane (RRC) protocol terminations towards the UE. The eNBs are interconnected with each other by means of a so-called X2 interface, and are also connected by means of a so-called S1 interface to an EPC (evolved packet core), e.g. to the MME (mobility management entity) and the UPE (user plane entity) which may form an access gateway (aGW). The S1 interface supports a many-to-many relation between MMEs/UPEs and eNBs, and provides a functional split between the MME and the UPE.

Figure 2:
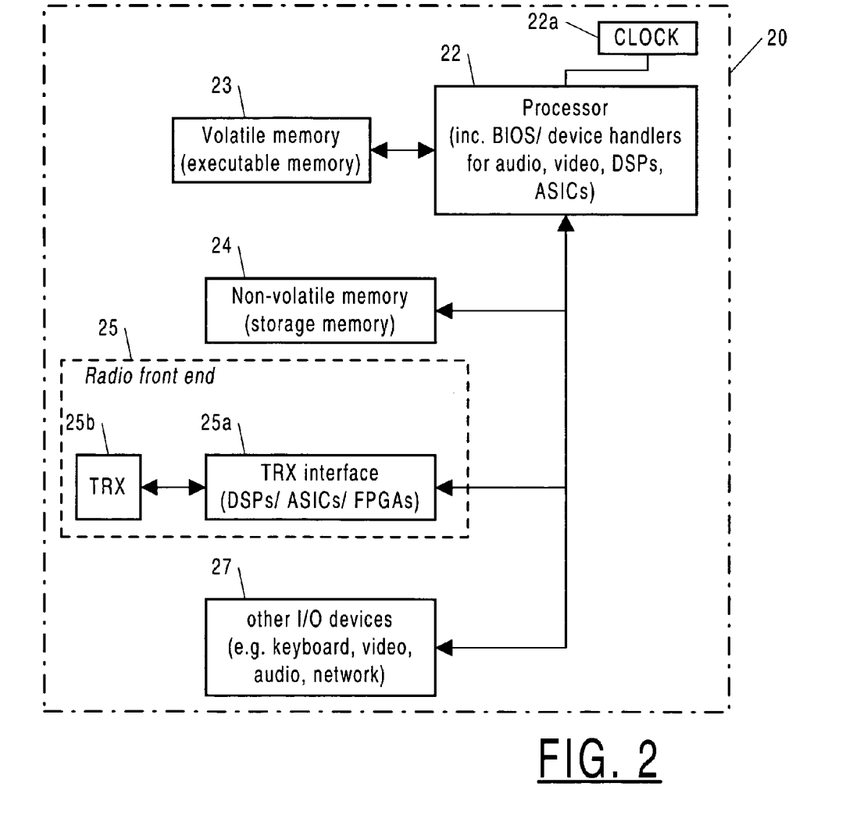
FIG. 2 is a reduced block diagram (only portions relevant to the invention being shown) of the UE terminal or the wireless terminal of the RAN of FIG. 1.

FIG. 2 shows some components of a communication terminal 20, which could be either the UE terminal 11 or the RAN wireless terminal 12a of FIG. 1, i.e. what is called here a base station (and so what encompasses a base transceiver station, a Node-B or a eNB). The communication terminal includes a processor 22 for controlling operation of the device, including all input and output. The processor, whose speed/timing is regulated by a clock 22a, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a radio front end 25 including a transceiver (TRX) 25b and a TRX interface 25a, the TRX interface including possibly one or more digital signal processors (DSPs), application specific integrated circuits (ASICs), and/or field programmable gate arrays (FPGAs).

The TRX enables communication over the air with another similarly equipped communication terminal. The communication terminal may also include (depending on the application) other I/O devices, such as a keyboard and a mouse or other pointing device, a video display, a speaker/microphone, and also a network interface (card), allowing wireline communication with other communication terminals, and in particular such communication over the Internet.

Still referring to FIG. 2, the communication terminal includes volatile memory, i.e. so-called executable memory 23, and also non-volatile memory 24, i.e. storage memory. The processor 22 may copy applications (e.g. a calendar application or a game) stored in the non-volatile memory into the executable memory for execution by the processor. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

The functionality described below (for both a base station of the radio access network and for the UE) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention can be provided as a computer program product including a computer readable storage structure embodying computer program code—i.e. the software—thereon for execution by a computer processor. An example is a so-called floppy disk having instructions for performing a method according to the invention encoded on the disk in machine (processor) readable form.

Now the invention in particular provides a random access procedure for use by a UE in obtaining a resource allocation on SCH for uplinking user data, and for use by a base station of a radio access network in providing the allocation. One or more embodiments of the invention provide one or more of the following (independent) features for the random access procedure in a radio access network such as, for example, the E-UTRA network, i.e. an evolved version of a UTRA network now under development by the 3GPP (third generation partnership program):

A. Preamble identifier in acknowledgment to preamble. To obtain an allocation on SCH, a UE transmits to a base station using RACH a preamble to a random access message burst, including in the preamble a signature (a signature being typically a pseudo-random code, conveyed typically as a 1 ms long waveform, intended as a temporary means of identifying the UE and/or the random access message). The UE then sends the base station the random access message burst itself, on SCH, but only after the base station has acknowledged (on DSCCH, i.e. downlink shared control channel) having received the preamble and has provided an allocation on SCH for uplinking the message burst, and further, the base station provides a preamble identifier with (one or more messages indicating) the acknowledgment. (The preamble may consist of only the signature, in which case the signature serves as the preamble, or may also include other components.) Using the preamble identifier, the base station can ask the UE to retransmit the random access message burst in case of an error in reception. The base station can then improve detection probability by combining the repeated transmissions (in what is called soft combining). More specifically:

The UE transmits the preamble including (possibly only) a signature on the random access channel in one of the time-frequency resources reserved for preambles.

If the base station (or Node-B or eNB) of the radio access network observes the signature, it associates a preamble identifier with the signature and the time-frequency resource, i.e. it keeps in a data store a table or other data structure relating the preamble identifier to the signature and the time-frequency resource.

The base station then sends the signature index, and if needed, also the time and frequency index of the preamble, and also the preamble identifier as an acknowledgment.

The UE receives the one or more messages indicating the acknowledgment (and providing the preamble identifier, and so on). The UE checks the signature, frequency and time indexes, and if the indexes correspond to the signature, frequency and transmission time of the preamble, the UE identifies itself with the preamble identifier and checks if resources are allocated with the acknowledgement.

The base station can immediately allocate a resource, i.e. a time and frequency on SCH for the random access message burst, or it can postpone allocation. When a suitable resource (time and frequency on SCH) becomes free, the base station allocates the resource to the UE for transmission of the message burst, using the preamble identifier to direct the allocation to the UE.

The UE transmits the message burst on the resource (a time and frequency on SCH) allocated by the base station, and includes in it a temporary address for the UE. The base station associates the message burst with its preamble based on the time and frequency used by the UE to transmit the message burst.

The UE continues to check whether the base station requires retransmission by checking for retransmission requests including the preamble identifier. The checking continues until the UE receives an acknowledgment for the message burst (i.e. that the base station has succeeded in decoding the message burst) or until the preamble identifier expires, which might typically occur 10 ms after transmission of the preamble.

The message burst includes, at least in some embodiments, an information field providing information useable by the radio access network in determining a further allocation to make to the UE to uplink user data. The message burst may also, itself, convey user data, and the UE may not require a further allocation on SCH. If a further allocation is required, the radio access network uses the information field in determining what further allocation on SCH to assign to the UE, and provides the allocation to the UE on DSCCH, possibly using the temporary address included in the message burst (in case the UE has a CRNTI), a CRNTI given for the UE in response to the random access message burst (in case the UE sent a random id in message) or even the preamble identifier (in case the Node-B allocates a CRNTI in the preamble response, i.e. in case the preamble identifier is a new CRNTI for the UE).

B. Hopping. Transmission of the random access message is extended over a few sub-frames using a narrow frequency band during each sub-frame but hopping the frequency between the sub-frames.

From the standpoint of the user equipment then, noteworthy features of a random access procedure according to the invention are first, that the UE obtains a preamble identifier from an acknowledgement of the preamble, and second, that the resource allocation for the random access message can be separate from the preamble acknowledgement, and third, that after sending the random access message, the UE must try to detect not only an acknowledgement of the message but also any request for retransmission of the random access message burst. Further, the separate preamble and/or the random access message burst may be frequency hopped.

From the standpoint of the base station, noteworthy features of a random access procedure according to the invention are that the base station assigns a preamble identifier for addressing the UE, and uses the preamble identifier to request retransmissions as needed, and utilizes HARQ (soft-combining) for decoding the random access message burst (on SCH).

Advantages

An advantage accruing from the use of a separate preamble and a preamble identifier is that HARQ can be used in the reception of the random access message burst. HARQ improves detection probability. Coverage is improved and also any delay is reduced since a UE does not have to restart a random access process from the preamble phase if the base station does not succeed in decoding after the first transmission; the UE just retransmits the message burst, using the preamble identifier to determine what to retransmit.

An advantage accruing from the use of frequency hopping is that good frequency diversity and coverage are obtained using fewer resources than in prior art systems, where the message is transmitted on a constant and wide frequency band. Frequency hopping randomizes both the fading of the UE's own signal and also interference: it is unlikely that fading and interference conditions are unfavorable on all the frequencies in a hopping pattern.

Preamble Identifier and Temporary Address and Determining Whether a Message Burst has Been Acknowledged Note that the invention uses a preamble identifier and a temporary address, but for different purposes. The preamble identifier is given by the base station for asking for retransmissions of the random access message burst. The temporary address, which can be a random address or a temporary cell specific address, is included by the UE in the message burst for the UE to be able to unambiguously identify messages intended for the UE. If the UE does not have a temporary cell specific address, the UE chooses a random address as a temporary address. After the UE sends the temporary address to the base station in the random access message burst, the UE then reads the downlink shared control channel (DSCCH), searching for uplink and downlink resource allocations that are directed to the UE using the UE's preamble identifier. An uplink resource allocation is understood by the UE as indicating that the UE must retransmit its random access message burst. A downlink resource allocation means that the base station has correctly decoded a random access message burst (per a CRC check), but not necessarily the message burst from the UE. The downlink resource allocation indicates a downlink shared channel resource the UE is to decode so as to obtain a temporary address. If the temporary address in the downlink message agrees with the UE's temporary address, the UE knows that the procedure was successful. On the other hand, if the temporary addresses do not agree, the UE is configured to terminate the procedure, since if the temporary addresses are not the same, the UE's preamble likely collided with the preamble of another UE (i.e. both the UE and another UE used the same access slot). To obtain a random address for use as a temporary cell specific address, the UE selects an address randomly from a set of addresses provided by a System Info message broadcast by the base station, which the UE reads after it has approximately synchronized to the base station (by procedures not the subject of the invention), i.e. synchronized except for taking into account propagation delays based on the UE to base station separation.

Content of the Random Access Message Burst

The probability that UEs might collide on the SCH after the RACH process should be made very small because such collisions would mean that there are UEs transmitting with a wrong timing advance and causing intra cell interference. In order to reach a low enough collision probability, a long enough random or an unambiguous UE address should be acknowledged during the random access procedure. Therefore, according to some embodiments of the invention, the random access message burst (which is sent on SCH) includes:

A temporary address (from 10 to 16 bits) that is the temporary cell specific address or a long enough random address serving as the temporary cell specific address. The temporary cell specific address would be used instead of the IMSI (International Mobile Subscriber Identity) stored in the Subscriber Identity Module (SIM) because transmission of the IMSI would unnecessarily prolong the message.

A small number (of the order of a byte or less) of information bits useable by the radio access network in making a further SCH allocation to the UE.

A Cyclic Redundancy Check (CRC) word.

The information bits could be used to indicate the need for (further) SCH communication resources, such as for an emergency call. Furthermore, the amount of data to be transmitted on the SCH could be roughly indicated.

Frequency Hopping and Frame Format of the Random Access Message Burst

Figure 3:
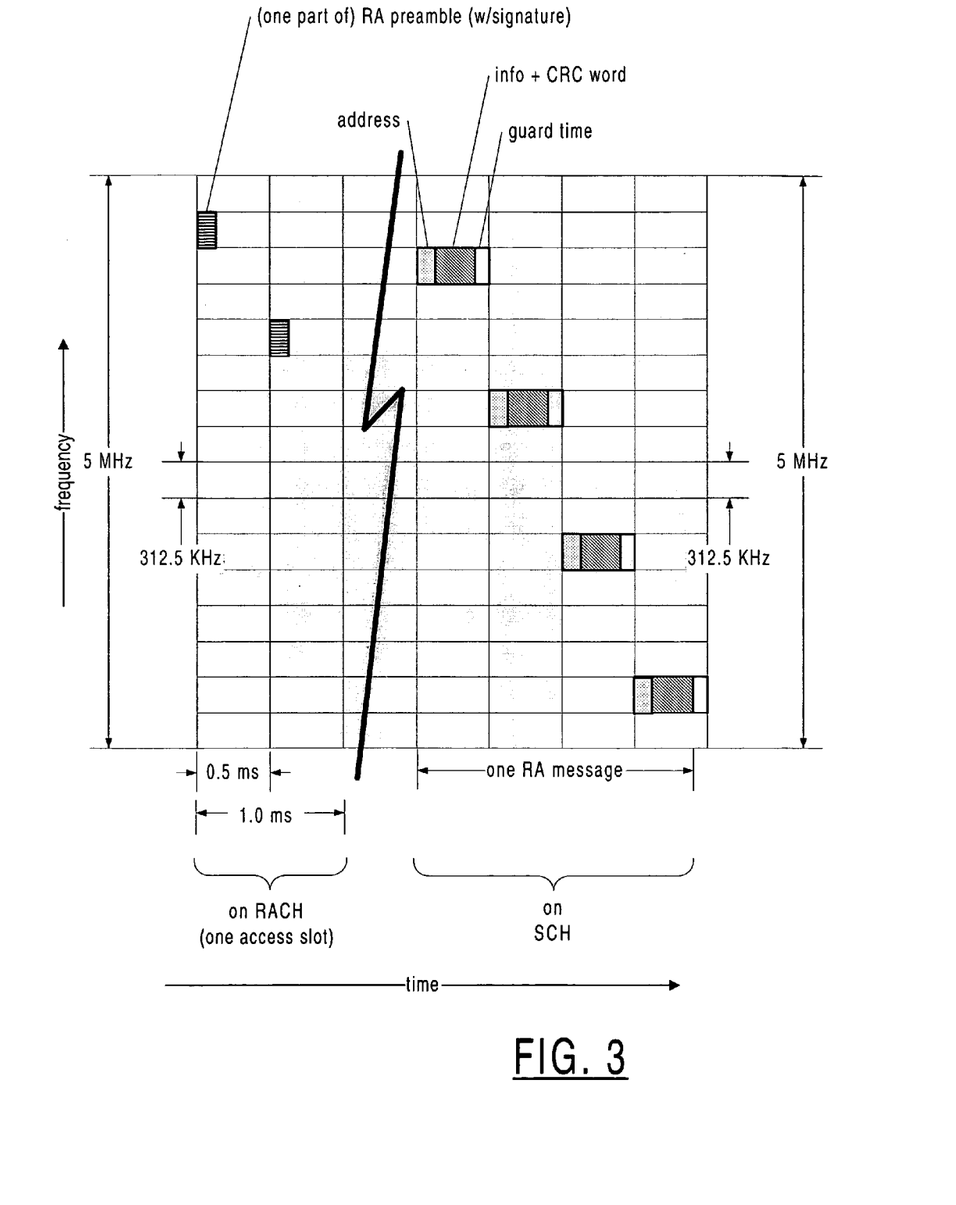
FIG. 3 is a schematic showing a random access preamble on RACH and a subsequent random access message burst on SCH, according to an embodiment of the invention.

Good frequency diversity is essential for obtaining short delays in the random access procedure. If the random access message burst has to be prolonged over a few sub-frames in order to give sufficient coverage, frequency diversity can be obtained economically by transmitting on the smallest possible bandwidth during each sub-frame but hopping the frequency between the sub-frames. This is illustrated in FIG. 3, showing a message burst extending over four sub-frames of SCH, i.e. comprising four sections, each occupying a respective sub-frame. The message burst consumes four resource blocks on SCH of 0.5 ms by 312.5 kHz. (This minimum frequency allocation of 312.5 kHz is just an example. The time frame could be two sub-frames or could be instead even less than a subframe.) As illustrated, a section of the message comprises a pilot or signature part, and data symbols, i.e. the payload, and each section is followed by a guard time/period (a portion of a sub-frame). The total length of a section of the message burst is therefore less than 0.5 ms (i.e. less than one sub-frame on SCH) because of the guard time, which is needed because of the UE not (at least sometimes) having a timing advance at this stage in the communication. FIG. 3 also show frequency hopping of the preamble (on RACH).

The encoding scheme for the message burst should preferably be such that each sub-frame is self-decodable. In the simplest example, identical symbols are transmitted during each sub-frame. In good conditions, the base station would succeed in decoding the message burst from the first sub-frame, which could speed-up the random access procedure, save resources and reduce interference if the base station could communicate an acknowledgment before the UE has sent the remainder of the message burst.

Other options for the length of the sections of a random access message burst can be considered. For example, a section can be longer than one sub-frame or even shorter than one sub-frame. Also, there can be gaps in the transmission of a message burst by a UE, so that the UE is silent during one or more sub-frames between transmitted sections of the message burst. This would allow time for the base station to terminate the message burst transmission if the base station succeeds in decoding the message burst after only the first section.

The frame format of a random access message burst according to the invention can be utilized in other cases when the timing advance for communication between a UE and a base station is uncertain but the UE has obtained a cell specific temporary address. Such a case is handover when handover is handled as in GSM (Global System for Mobile communication). Then the UE would get the address for the target cell through the serving base station. The target base station would start to allocate uplink resources when the UE should be ready to read the downlink shared control channel (DSCCH) carrying information on uplink communication channel allocations. The first transmission by the UE would be made with a frame format allowing uncertainty of timing advance, as in the frame format of a random access message burst according to the invention, i.e. the UE would start transmission in the target cell using the frame format of the invention even though there is no contention of the uplink communication resource in the case of handover.

Figure 4:
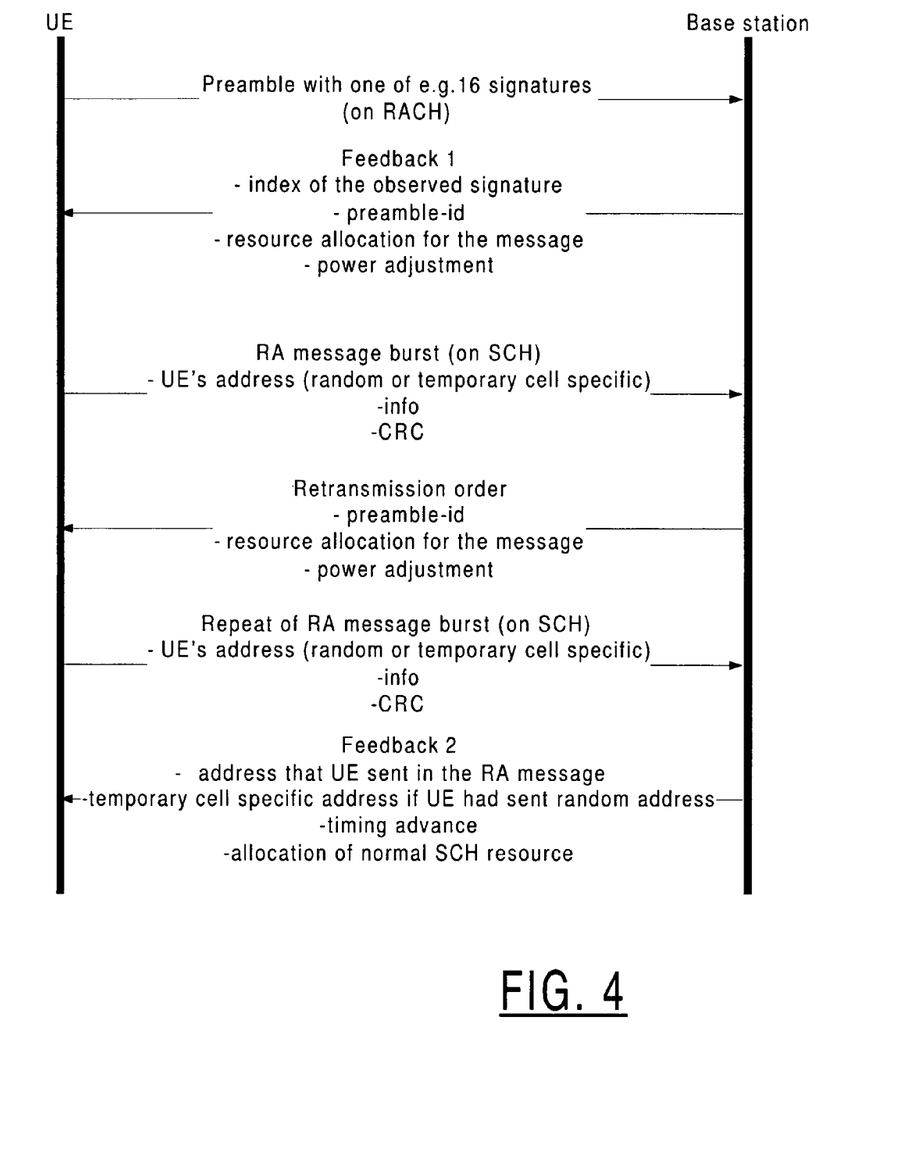
FIG. 4 is a signaling flow for the random access procedure according to an embodiment of the invention, including one retransmission of a (random access) message burst shown as an example.

Detail of Illustrative Embodiment of Random Access Procedure with a Separate Preamble Phase, i.e. Preamble Identifier Provided with ACK by Base Station (FIG. 4)

The signaling flow of a random access procedure according to an embodiment of the invention is shown in FIG. 4. In this embodiment access slots of RACH are reserved for sending preambles. The UE chooses an access slot and sends to the (serving) base station (eNB in E-UTRA) a preamble with a signature selected from a small set (e.g. 16). After a fixed period of time from reception of the preamble by the base station, i.e. after the base station actually receives the preamble, the base station sends a first feedback message (indicated as feedback 1 in FIG. 4) on DSCCH one or more messages serving to acknowledge receipt of the preamble, and includes in the first feedback a digest of the signature or an index of the signature (serving to identify to the UE the preamble being acknowledged, and so the first feedback is understood by the user equipment to be an acknowledgement because the first feedback identifies the preamble via the signature included in the preamble), a transmit power adjustment field, and a short identifier called here a preamble identifier (indicated as preamble-id in FIG. 4), and also a pointer to a resource on SCH for sending the random access message burst (i.e. the data/payload). The pointer need not necessarily be given in the same message as the preamble identifier, because the pointer can be provided to the UE in a follow-up message (still part of feedback 1) addressed also to the UE using the preamble identifier. Note that the resources for the message burst are reserved only after the base station observes a preamble, and note also that UEs with different signatures would be given different resources for transmission of their respective message bursts. The resources for the preambles and the cell specific access parameters are given in the System Info broadcast by the base station.

Now one or more UEs may recognize themselves from the preamble identifier of the first feedback and would then associate themselves with the preamble identifier (because it is possible for more than one UE to transmit a preamble at the same time, since the RACH is a contention-based resource, i.e. it is not shared via a multiple access mechanism). Each such UE will read the downlink shared control channel (DSCCH), and when a resource on (uplink) SCH is pointed to on the DSCCH using the preamble identifier, the UE will send its random access message burst via the resource, using a zero timing advance. The message burst fields are as explained above, i.e. a temporary address, information bits, and a CRC word. The probability that two UEs would have the same temporary address field is small because the address is either a unique or at least relatively long random bit sequence. After a successful reception of the message burst, the base station sends a second feedback (indicated as feedback 2 in FIG. 4), which contains the temporary address, the timing advance value, and a pointer to a further SCH resource to continue the uplink/message exchange, as needed. After this second feedback, only the UE terminals that find their temporary address in the second feedback would continue the message exchange. Terminals that succeed in decoding the second feedback but that do not find their temporary address in it must start the random access procedure from the beginning.

If the base station does not succeed in decoding the random access message burst from a particular one of the one or more UEs, it can ask the UE to retransmit the message burst by addressing the UE again with the preamble identifier, which is used for allowing the base station to request retransmission, whereas the temporary address is for separating UE's that have chosen the same signature and access slot. The base station can then soft combine the symbols of the latest received random access message burst from the UE with the symbols of the earlier transmissions, i.e. the base station can use HARQ processing in the random access procedure. This greatly improves the probability of detection. The base station may also optimize for delay by asking the UE to repeat transmission of the random access message before trying to decode it.

The preamble identifier can be short (e.g. 5 bits) if it is predetermined that the preamble identifier is to be valid only for a relatively short time (e.g. 10 ms) after it has been associated by the base station with a signature observed by the base station in a certain time and frequency resource. A time period of 10 ms would still allow time for a few retransmissions of the message part.

It may not be useful to send the timing advance to a UE terminal in the first feedback since two UE terminals, say terminal X and terminal Y, might have sent a preamble with the same signature but the base station has only detected the preamble sent by terminal X. The timing advance suitable for terminal Y could be completely different from the one for terminal X. When terminal Y transmits with the timing advance meant for terminal X, the transmission could overlap a previous or later timeslot. After the UEs address has been indicated in the second feedback, the collision probability becomes sufficiently small for the application of timing advance. So the timing advance is advantageously provided in the second feedback, as indicated in FIG. 4.

Note that with a random access procedure according to the invention, two UEs send their respective random access message bursts on the same resource (of SCH) only if they have chosen the same preamble signature.

Utilization of frequency hopping during transmission of the random access message burst is advantageous, too. Both the (separate) preamble and the message burst can be divided into sections that are transmitted at different frequencies.

An Illustrative Example

The following is an example of the use of the random access procedure according to one embodiment of the invention, in the case where a UE uses the random access procedure to request an allocation on the shared channel SCH for uplinking user data. (Although in this example, the UE uses the random access message burst only for indicating the need for an allocation on SCH, so that the base station can determine how much of a resource is needed, the invention also allows a UE to use the information bits in the random access message burst itself to uplink user data.)

Preamble

The preamble is transmitted on RACH in a narrow BW (e.g. resource chunk of 1.25 MHz/3) of RACH. See FIG. 3. Its length is set to two sub-frames. The frequency is hopped between the sub-frames in order to gain diversity.

The symbol sequence is chosen randomly from a set of signatures. The random selection is repeated for every retransmission. The set of available signatures is given in the so-called System Info broadcast by the base station.

Open loop power control is utilized: the transmission power is tuned according to the measured downlink attenuation and the desired power level in the base station receiver. In addition, power ramp-up is done if the preamble transmission has to be repeated. The parameters are given in the System Info.

The density of access slots is chosen according to the RACH load and the delay requirements (waiting for the first access slot must not take too long).

The time window for selection of the access slot is growing exponentially with each repeated transmission of the preamble, or some other way of randomizing transmission times is utilized.

Preamble Acknowledgment

Preamble acknowledgment is provided in the Allocation Table transmitted on the downlink shared control channel (DSCCH).

The base station measures impulse response for each signature and access slot and sends an acknowledgment in downlink, if it observes a preamble.

The fields in the positive acknowledgment are:

The signature number or a digest of the signature sent by the UE. The access slot number is not necessary if the acknowledgment can be sent in the downlink sub-frame with fixed offset in relation to the access slot. Even with the largest system bandwidth, (time) overlapping access slots that can be separated only by the frequency are likely not needed.

The resource allocation (on SCH) for the message burst (i.e. time and frequency slots on SCH, for the UE to uplink the random access message burst). As noted above, the resource allocation can be postponed to be sent separately from the rest of the acknowledgement.

A short identifier preamble identifier (preamble-id) for the base station would to use to ask for a repeat transmission of the message burst.

Power adjustment relative to the preamble power.

Providing a timing advance (value) may not be useful in this stage because, depending on the load and the number of signatures and access slots, it can become too probable that two or more UEs might send preambles in the same access slot with the same signature. The timing advance value would be correct for only one of them.

The base station can also send a NACK: UEs that had sent a preamble in the access slot have to stop the RACH procedure. This provides means to recover from RACH overload.

The Random Access Message Burst

The random access message burst is sent on SCH using a narrow bandwidth (e.g. resource chunk of 1.25 MHz/3) and extending over a few sub-frames, hopping the frequency between the sub-frames. A tentative value for the length of the burst is 4 sub-frames. The prolonging over a few sub-frames seems necessary in order to fulfill the coverage requirements.

Exemplary content of the random access message burst is:

Temporary cell specific address or a random address (e.g. 16 bits), if the temporary cell specific address does not exist;

Information bits, i.e. up to 10 bits (or possibly more) for informing the base station of the need for the requested communication resources; and a CRC word (e.g. 12 or 16 bits).

The random address has to be long enough since it separates all UEs that have sent preambles in the same access slot with the same signature.

Acknowledgment of the Random Access Message Burst

Acknowledgement of the random access message burst is provided in the Allocation Table that is transmitted on the shared control channel in downlink. If the CRC fails, the base station can ask for retransmission of the message burst by using the preamble identifier it provided in acknowledgment of the preamble. If the CRC succeeds, the UE's address (temporary cell specific or random) is acknowledged. A temporary cell specific address is given if the UE sent a random address.

The timing advance can be used after receiving the acknowledgment of the random access message burst because the temporary cell specific address has identified the UE uniquely and the random address nearly uniquely.

A resource allocation (on SCH) for the uplink message can be given as a regular SCH entry in the Allocation Table.

Discussion

So in this illustrative example of a UE attempting to obtain an allocation on SCH, a UE sends a preamble with a signature on RACH. The base station acknowledges on DSCCH with a preamble identifier, an index (also called a signature number) of the signature (although a digest of the signature could be sent instead) so that the UE knows the ACK is to its preamble, and a SCH (shared channel) allocation (a time slot and frequency on SCH) for transmission of the random access message burst (which may be given in a different message than the preamble identifier). The UE then sends the message burst (including the info field, indicating the need for a further allocation on SCH) with the preamble identifier on the allocated time slot and frequency. There can be a collision, since another UE could have sent a preamble with identical parameters and thus obtained the same SCH allocation for the random access message. In the message burst, the UE includes a temporary address the base station can use to identify the UE. The base station asks the UE for repeats as necessary, using the DSCCH, if it cannot decode the message burst (possibly using soft-combining/HARQ in its attempts to decode), and the base station uses the preamble identifier to address the repeat request to the UE. (The base station knows what preamble identifier to use based on the time slot and frequency used by the UE to transmit the message burst). The base station succeeds in decoding the message burst, and then makes a further SCH allocation to the UE (via DSCCH), and the further SCH allocation is addressed to the UE using the address the UE included in the message burst or using the preamble identifier or a temporary cell specific identifier that the base station provides for the UE in the acknowledgement of the random access message.

CONCLUSION

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   transmitting a message burst preamble by a user equipment over a random access channel of a wireless communication system, and including a signature with the preamble;
   receiving by the user equipment, one or more messages in response to said transmission, said one or more messages indicating an acknowledgment of having received the preamble and providing a preamble identifier and a resource allocation of a shared channel; and
   transmitting a message burst by the user equipment on the shared channel according to the resource allocation, and including an address in the message burst for use in identifying the user equipment.

2. The method of claim 1, wherein the resource allocation is provided in a message separate from the message indicating the acknowledgment.

3. The method of claim 1, wherein if the user equipment has a temporary cell specific address then the user equipment uses the temporary cell specific address as the address.

4. The method of claim 1, further comprising:
   receiving a request for retransmission from the base station indicating the preamble identifier; and
   retransmitting the message burst to the base station.

5. The method of claim 4, wherein the request for retransmission is a signal from the base station on a downlink shared control channel indicating an uplink resource allocation and including the preamble identifier.

6. The method of claim 1, further comprising receiving an acknowledgement of the base station having received the message burst, wherein the acknowledgement is a signal from the base station on a downlink shared control channel indicating a downlink resource allocation and including the preamble identifier, and wherein the user equipment is configured to decode the signal and obtain an address indicated by the signal, and then compare the address with the address included by the user equipment in the message burst to determine if the acknowledgement is an acknowledgement of the message burst or instead the acknowledgement of a message burst from another user equipment.

7. The method of claim 1, further comprising:
   transmitting a portion of the message burst using a first narrow frequency range of the shared channel frequency range; and
   transmitting another portion of the message burst using a second narrow frequency range of the shared channel frequency range different from the first narrow frequency range.

8. The method of claim 1, further comprising transmitting the preamble in part using a first narrow frequency range of the random access channel frequency range and in part using a second narrow frequency range of the random access channel frequency range different from the first.

9. The method of claim 1, further comprising obtaining from the one or more messages indicating the acknowledgement a digest of the signature or a signature number, and determining whether the acknowledgment is an acknowledgement of the preamble sent by the user equipment or an acknowledgment of a message from another user equipment wireless communication device.

10. The method of claim 1, further comprising receiving from the base station a further allocation of the shared channel for uplink of user data in response to the message burst, wherein the allocation is provided with the address provided by the user equipment, and wherein the message burst includes information bits providing information useable by the base station in determining the further allocation to assign to the user.

11. A computer-readable non-transitory storage medium having computer-executable components comprising instructions for performing the method according to claim 1.

12. An apparatus for use by a user equipment in communicating with a base station of a radio access network of a wireless communication system, comprising means for performing the method of claim 1, where the means for performing the method comprises at least one processor and at least one non-transitory memory including computer program code at the user equipment.

13. An apparatus, comprising at least one processor and at least one non-transitory memory including computer program code, the at least one memory and the computer program code configured to, with the at least one processor, cause the apparatus to:
   transmit a message burst preamble, with a signature, to a base station of a radio access network over a random access channel of a wireless communication system;
   receive from the base station in response one or more messages that indicate an acknowledgment of having received the preamble and that provide a preamble identifier and a resource allocation of a shared channel; and
   provide a message burst for transmission to the base station on the shared channel according to the resource allocation, the message burst including an address for use in identifying a user equipment.

14. The apparatus of claim 13, wherein the apparatus is configured to receive the resource allocation in a message separate from the message indicating the acknowledgment.

15. The apparatus of claim 13, wherein the apparatus is so configured that if the user equipment has a temporary cell specific address then the user equipment uses the temporary cell specific address as the address.

16. The apparatus of claim 13, wherein the apparatus is further configured to:
   receive a request for retransmission from the base station indicating the preamble identifier; and
   provide the message burst for retransmission to the base station.

17. The apparatus of claim 16, wherein the request for retransmission is a signal from the base station on a downlink shared control channel indicating an uplink resource allocation and including the preamble identifier.

18. The apparatus of claim 13, wherein the apparatus is further configured to receive an acknowledgement of the base station having received the message burst, wherein the acknowledgement is a signal from the base station on a downlink shared control channel indicating a downlink resource allocation and including the preamble identifier, and wherein the apparatus is configured to decode the signal and obtain an address indicated by the signal, and then compare the address with the address included by the user equipment in the message burst to determine if the acknowledgement is an acknowledgement of the message burst or instead the acknowledgement of a message burst from another user equipment.

19. The apparatus of claim 13, wherein the apparatus is further configured to:
   provide for transmission a portion of the message burst using a first narrow frequency range of the shared channel frequency range; and provide for transmission another portion of the message burst using a second narrow frequency range of the shared channel frequency range different from the first narrow frequency range.

20. The apparatus of claim 13, wherein the apparatus is further configured to provide the preamble for transmission in part using a first narrow frequency range of the random access channel frequency range and in part using a second narrow frequency range of the random access channel frequency range different from the first.

21. The apparatus of claim 13, wherein the apparatus is further configured to obtain from the one or more messages indicating the acknowledgement a digest of the signature or a signature number, and determine whether the acknowledgment is an acknowledgement of the preamble sent by the user equipment or an acknowledgment of a message from another user equipment wireless communication device.

22. The apparatus of claim 13, wherein the apparatus is further configured to receive from the base station a further allocation of the shared channel for uplink of user data in response to the message burst, wherein the allocation is provided with the address provided by the user equipment, and wherein the message burst includes information bits providing information useable by the base station in determining the further allocation to assign to the user.

23. A user equipment, comprising:
an apparatus as in claim 13; and
a radio front end for transmitting the preamble and the message burst, and for receiving the acknowledgement.

24. A method, comprising:
receiving a message burst preamble and a signature from a user equipment over a random access channel of a wireless communication system by a base station of a radio access network;
transmitting one or more messages to the user equipment in response to the message burst preamble, wherein the one or more messages indicate an acknowledgment of having received the preamble and include a preamble identifier and a resource allocation of at least a portion of a shared channel; and
receiving a message burst from the user equipment on the shared channel according to the resource allocation, decoding the message burst, and obtaining an address in the message burst for use in identifying the user equipment.

25. The method of claim 24, wherein the resource allocation is provided in a message separate from the message indicating the acknowledgment.

26. The method of claim 24, wherein when the user equipment has a temporary cell specific address the address included in the message burst is the temporary cell specific address.

27. The method of claim 24, further comprising:
transmitting to the user equipment a request to retransmit the message burst, and including the preamble identifier in the request in order to identify the message burst; and
receiving the retransmitted message burst and soft-combining the retransmitted message burst with previous transmissions of the message burst.

28. The method of claim 27, wherein the request to retransmit the message burst is a signal from the base station on a downlink shared control channel indicating an uplink resource allocation and including the preamble identifier.

29. The method of claim 24, further comprising providing an acknowledgement of the base station having received the message burst, wherein the acknowledgement is a signal from the base station on a downlink shared control channel indicating a downlink resource allocation and including the preamble identifier.

30. The method of claim 24, further comprising:
receiving a portion of the message burst using a first narrow frequency range of the shared channel frequency range; and
receiving another portion of the message burst using a second narrow frequency range of the shared channel frequency range different from the first narrow frequency range.

31. The method of claim 24, further comprising receiving the preamble in part in a first narrow frequency range of the random access channel frequency range and in part in a second narrow frequency range of the random access channel frequency range different from the first.

32. The method of claim 24, further comprising providing in the acknowledgement a digest of the signature or a signature number.

33. The method of claim 24, further comprising providing to the user equipment a further allocation of the shared channel for uplink of user data in response to the message burst, wherein the allocation is provided with the address provided by the user equipment, and wherein the base station decodes information bits included in the message burst and determines the further allocation at least in part based on the information bits.

34. A computer-readable non-transitory storage medium having computer-executable components comprising instructions for performing the method according to claim 24.

35. An apparatus for use by a base station of a radio access network of a wireless communication system in communicating with a user equipment, comprising means for performing a method according to claim 24, where the means for performing the method comprises at least one processor and at least one non-transitory memory including computer program code at the base station.

36. An apparatus, comprising at least one processor and at least one non-transitory memory including computer program code, the at least one memory and the computer program code configured to, with the at least one processor, cause the apparatus to:
receive a message burst preamble and a signature from a user equipment of a radio access network over a random access channel of a wireless communication system;
provide for transmission to the user equipment of one or more messages in response to the message burst preamble, wherein the one or more messages indicate an acknowledgment of having received the preamble and include a preamble identifier and a resource allocation of at least a portion of a shared channel; and
receive from the user equipment a message burst on the shared channel according to the resource allocation, decode the message burst, and obtain an address from the message burst for use in identifying the user equipment.

37. The apparatus of claim 36, wherein the apparatus is further configured to provide the resource allocation in a message separate from the message indicating the acknowledgment.

38. The apparatus of claim 36, wherein when the user equipment has a temporary cell specific address the address included in the message burst is the temporary cell specific address.

39. The apparatus of claim 36, wherein the apparatus is further configured to:

provide for transmission to the user equipment a request to retransmit the message burst, and include the preamble identifier in the request in order to identify the message burst; and receive the retransmitted message burst and soft-combine the retransmitted message burst with previous transmissions of the message burst.

40. The apparatus of claim 39, wherein the request to retransmit the message burst is a signal from the base station on a downlink shared control channel indicating an uplink resource allocation and including the preamble identifier.

41. The apparatus of claim 36, wherein the apparatus is further configured to provide an acknowledgement of the base station having received the message burst, wherein the acknowledgement is a signal from the base station on a downlink shared control channel indicating a downlink resource allocation and including the preamble identifier.

42. The apparatus of claim 36, wherein the apparatus is further configured to:

receive a portion of the message burst using a first narrow frequency range of the shared channel frequency range; and receive another portion of the message burst using a second narrow frequency range of the shared channel frequency range different from the first narrow frequency range.

43. The apparatus of claim 36, wherein the apparatus is further configured to receive the preamble in part in a first narrow frequency range of the random access channel frequency range and in part in a second narrow frequency range of the random access channel frequency range different from the first.

44. The apparatus of claim 36, wherein the apparatus is further configured to provide in the acknowledgement a digest of the signature or a signature number.

45. The apparatus of claim 36, wherein the apparatus is further configured to provide to the user equipment a further allocation of the shared channel for uplink of user data in response to the message burst, wherein the allocation is provided with the address provided by the user equipment, and wherein the base station is further configured to decode information bits included in the message burst and determine the further allocation at least in part based on the information bits.

46. A base station of a radio access network of a wireless communication system, comprising:

an apparatus as in claim 36; and a radio front end for receiving the preamble and the message burst, and for transmitting the acknowledgment.

47. A system, comprising:

a plurality of base stations as in claim 46; and a plurality of user equipment terminals configured for wirelessly coupling to the base stations.

48. An apparatus, comprising:

means for transmitting a message burst preamble to a base station of a radio access network over a random access channel of a wireless communication system, and for including a signature with the preamble, where the means for transmitting the message burst preamble comprises at least one processor and at least one non-transitory memory including computer program code;

means for receiving from the base station in response one or more messages indicating an acknowledgment of having received the preamble and providing a preamble identifier and a resource allocation of a shared channel, where the means for receiving and providing comprises the at least one processor and the at least one non-transitory memory including computer program code; and means for transmitting a message burst on the shared channel according to the resource allocation, and for including an address in the message burst for use in identifying a user equipment, where the means for transmitting the message burst on the shared channel comprises the at least one processor and the at least one non-transitory memory including computer program code.

49. An apparatus, comprising:

means for receiving a message burst preamble and a signature from a user equipment of a radio access network over a random access channel of a wireless communication system, where the means for receiving the message burst preamble comprises at least one processor and at least one non-transitory memory including computer program code;

means for transmitting one or more messages to the user equipment in response to the message burst preamble, wherein the one or more messages indicate an acknowledgment of having received the preamble and include a preamble identifier and a resource allocation of at least a portion of a shared channel, where the means for transmitting one or more messages to the user equipment comprises the at least one processor and the at least one non-transitory memory including computer program code; and means for receiving a message burst from the user equipment on the shared channel according to the resource allocation, for decoding the message burst, and for obtaining an address from the message burst for use in identifying the user equipment, where the means for receiving and obtaining comprises the at least one processor and the at least one non-transitory memory including computer program code.

* * * * *